Figure 1:
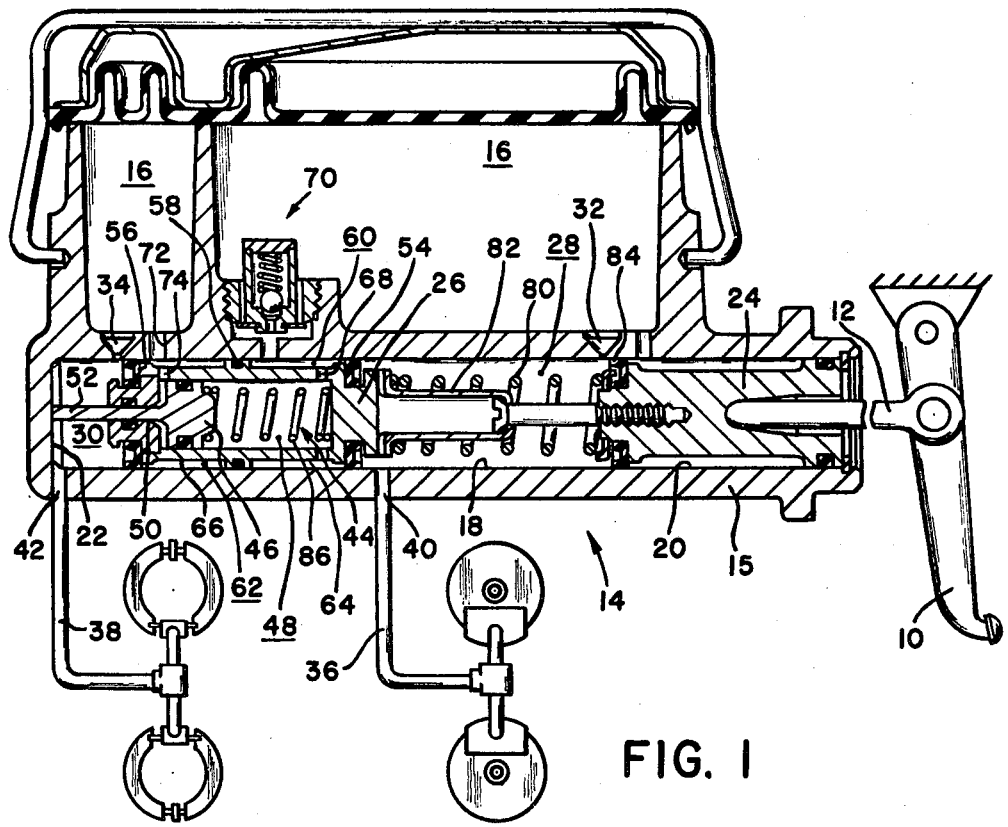

United States Patent [19]

Gaiser

[11] 4,398,390

[45] Aug. 16, 1983

[54] MASTER CYLINDER WITH FAST FILL AUXILIARY CHAMBER WITHIN A PISTON

[75] Inventor: Robert F. Gaiser, Stevensville, Mich.

[73] Assignee: The Bendix Corporation, Southfield, Mich.

[21] Appl. No.: 388,382

[22] Filed: Jun. 14, 1982

Related U.S. Application Data

[63] Continuation of Ser. No. 155,352, Jun. 2, 1980, abandoned.

[51] Int. Cl.³ .............................................. B60T 11/20
[52] U.S. Cl. ....................................... 60/562; 60/578; 60/591
[58] Field of Search ................. 60/562, 568, 574, 578, 60/581, 588, 591, 576

[56] References Cited

U.S. PATENT DOCUMENTS

| | | | |
|---|---|---|---|
| 3,140,587 | 7/1964 | Stelzer | 60/562 |
| 3,312,062 | 4/1967 | MacDuff | 60/562 |
| 3,605,410 | 9/1971 | Herriott | 60/562 |
| 3,698,190 | 10/1972 | Miyai | 60/562 |
| 4,086,770 | 5/1978 | Shaw | 60/562 |
| 4,133,178 | 1/1979 | Brooks, Sr. | 60/578 |
| 4,170,386 | 10/1979 | Shutt | 60/574 |
| 4,201,054 | 5/1980 | Bainbridge | 60/562 |
| 4,311,007 | 1/1982 | Gaiser | 60/562 |

FOREIGN PATENT DOCUMENTS 2735847  2/1978  Fed. Rep. of Germany ........ 60/581

Primary Examiner—Abraham Hershkovitz
Attorney, Agent, or Firm—Paul David Schoenle; Ken C. Decker

[57] ABSTRACT

A master cylinder includes a housing defining a reservoir containing fluid. A bore within the housing communicates with the reservoir and movably receives a pair of pistons which substantially define a pair of pressure chambers. One of the pistons includes a cavity movably receiving a position sensitive piston which cooperates with the one piston to define an auxiliary pressure chamber. When the one piston is moved during a brake application, the position sensitive piston is movable relative to the one piston to generate fluid pressure within the auxiliary pressure chamber. A passage between the auxiliary pressure chamber and one of the pair of pressure chambers provides one way communication between the auxiliary and one pressure chambers.

3 Claims, 2 Drawing Figures

MASTER CYLINDER WITH FAST FILL AUXILIARY CHAMBER WITHIN A PISTON

This is a continuation, of application Ser. No. 155,352, filed June 2, 1980, now abandoned.

This invention relates to a master cylinder which is responsive to a brake application to generate fluid pressure within a pair of brake circuits. A pair of pistons within a housing define pressure chambers communicating with respective brake circuits. During braking the pair of pistons are movable within the housing to generate fluid pressure within each pressure chamber.

In the prior art, such as illustrated by U.S. Pat. No. 4,133,178 and 4,086,770, a fast fill chamber between the primary piston and the housing communicated with a reservoir via a relief and replenish valve assembly. During braking the fast fill chamber was pressurized to communicate fluid pressure to a primary pressure chamber. Above a predetermined pressure level the relief and replenish valve assembly was operable to vent the fast fill chamber to the reservoir. As long as the pressure level within the fast fill chamber remains below the predetermined value, the fluid pressure generated in the fast fill chamber is communicated to the primary pressure chamber. In order to provide the space required by the fast fill chamber, the housing bore receiving the primary piston is stepped to form a shoulder. In a similar manner, the primary piston is stepped to sealingly engage a small diameter portion of the bore and a large diameter portion of the bore. Because the primary piston is movable within the bore, the concentricity between the bore and primary piston must be maintained within a small tolerance. Consequently, manufacture of the bore and primary piston in prior art fast fill master cylinders required special attention during the machining operation to fit within the small tolerance specification. If the tolerance was not maintained, the primary piston and stepped bore were not concentric so that the primary piston tended to wedge in the stepped bore rather than moving freely therein.

The present invention provides a fast fill master cylinder without the problems appurtinent to a stepped bore. It provides a fast fill auxiliary chamber within one of the pair of pistons so that the step required in the bore and primary piston of the prior art is no longer required. In particular, the auxiliary chamber receives a position sensitive piston cooperating with the one piston to generate fluid pressure in the auxiliary chamber in response to movement of the one piston. A passage between the auxiliary chamber and one of the pair of pressure chambers includes a one way check valve permitting fluid communication from the auxiliary chamber to the one pressure chamber. Consequently, during a brake application, the one pressure chamber is pressurized in response to contraction of the fluid therein and also in rersponse to the pressurized fluid communicated from the auxiliary chamber.

It is an advantageous effect of the present invention that the stepped bore and stepped piston required to define a fast fill chamber can be eliminated without sacrificing a fast fill feature. Therefore, manufacturing tolerances for the housing bore and primary piston can be held within standard machining limits.

Figure 2:
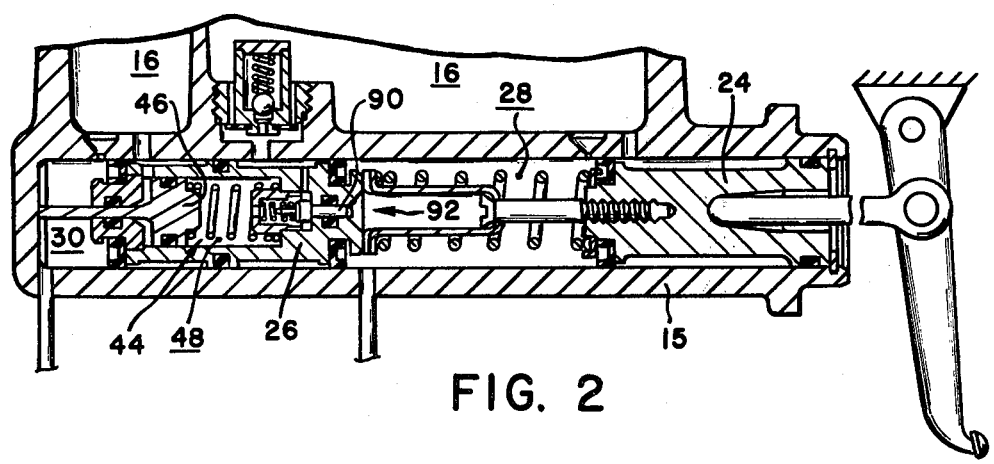

One way of carrying out the invention is described in detail with reference to the drawings which illustrate two specific embodiments, in which:

FIG. 1 is a schematic illustration of a brake system having a master cylinder constructed in accordance with the present invention shown in cross section; and FIG. 2 is a cross-sectional view of a master cylinder similar to FIG. 1 but also including a proportioning and by-pass valve assembly.

In FIG. 1 the brake system includes a brake pedal 10 coupled to an input rod 12. A master cylinder 14 includes a housing 15 forming a reservoir 16 and a bore 18. The bore extends from an opening 20 to an end wall 22. A pair of pistons 24 and 26 are movably received within the bore 18 and cooperate with the wall of the housing bore to substantially define a pair of pressure chambers 28 and 30. Each pressure chamber communicates with the reservoir 16 via respective ports 32 and 34 and also communicates with brake circuits 36 and 38 via respective outlets 40 and 42.

In accordance with the invention, the piston 26 is provided with a cavity 44 completely disposed within the piston. A position sensitive piston member 46 is disposed within the cavity 44 and cooperates with the piston 26 to substantially define a variable volume auxiliary pressure chamber 48. An aperture 50 in the piston receives an outwardly extending stem 52 of the member 46 which engages the housing end wall 22 within the pressure chamber 30. In this respect, the piston 26 is substantially similar to the invention described in my copending U.S. application No. 80,823, filed Oct. 1, 1979. This piston 26 carries lip seals 54 and 56 exposed to respective pressure chambers 28 and 30 and an intermediate seal 58 cooperating with the housing bore to separate a first clearance 60 from a second clearance 62. Each clearance is formed between the bore 18 and a recess on the piston 26 at 64 and 66.

The clearance 60 communicates with the auxiliary pressure chamber 48 via an opening 68 and also communicates with the reservoir 16 via a relief and replenish valve assembly 70. The clearance 62 communicates with the reservoir 16 via an opening 72 and also communicates with the cavity 44 on the left side of piston member 46 via opening 74.

The relief and replenish valve assembly 70 is described in more detail in my copending U.S. application relating to invention disclosure 320-80-021-0. However, the assembly communicates fluid from the reservoir to the bore clearance 60 and provides for restricted communication in the reverse direction below a predetermined pressure level within the clearance 60. Above this pressure level, the assembly opens to communicate the clearance 60 with the reservoir.

Referring to FIG. 1, the input rod 12 is moved to the left toward the master cylinder in response to application of the pedal 10 during braking. The piston 24 is also moved to the left by the input rod 12 to contract a spring 80 carried between the piston 24 and a retainer 82 engaging the piston 26. At about the same time, the lip seal 84 carried by piston 24 closes port 32 and the contracting spring 80 forces the piston 26 to move to the left. As a result, the piston member 46 and stem remain stationary with the stem engaging the wall 22. Fluid within the auxiliary chamber 48 is pressurized in response to contraction of the volume of the chamber. The lip seal 54 acts as a one way check valve permitting fluid communication from the clearance 60 to the chamber 28. Therefore, increasing fluid pressure within chamber 48 communicates with clearance 60, past lip seal 54 to chamber 28. The restriction provided by relief and replenish valve assembly 70 is greater initially than for lip seal 54, so that a majority of the fluid pressure within chamber 48 and clearance 60 is initially communicated to chamber 28. The opening 72, clearance 62 and opening 74 provide for communication of reservoir fluid to the left side of member 46 as the volume on this side is expanding in response to leftward movement of the piston 26 relative to the piston member 46.

With increasing fluid pressure in chamber 48 as the pistons continue to more to the left, the relief and replenish valve assembly 70 is biased to an open position to vent the clearance 60 and chamber 48 to the reservoir 16.

Upon termination of braking a spring 86 extending between the member 46 and the wall of cavity 44 biases the piston 26 to return to its rest position shown. The spring 80 also biases the piston 24 to return to its rest position. The fluid on the left side of piston member 46 returns to the reservoir via opening 74, clearance 62 and opening 72. The expansion of chamber 48 draws fluid from the reservoir via the relief and replenish valve assembly 70 to permit return of the piston 26 to its rest position.

In the alternative embodiment of FIG. 2 like reference numerals refer to similar parts in FIG. 1. The piston 26 of FIG. 2 includes a passage 90 extending from the auxiliary chamber 48 to the pressure chamber 28. A proportioning and bypass valve assembly 92 is disposed within the passage 90. The operation of the proportioning and bypass valve assembly is described in detail in my copending U.S. application No. 80,823, filed Oct. 1, 1979. The alternative embodiment operates in the same manner as the embodiment of FIG. 1, except that the proportioning and bypass valve assembly is responsive to the fluid pressure within chamber 28 to control the release of fluid pressure from the auxiliary chamber 48. As a result the fluid pressure developed in chamber 30 is less than the fluid pressure developed in chamber 28 when the pressure in the latter is above a predetermined proportioning value. Also, if chambers 28 and 48 are vented to atmosphere via a leak in circuit 36, the proportioning and bypass valve assembly remains in an open position to vent the auxiliary chamber, thereby permitting movement of piston 26 to pressurize chamber 30 in the absence of a proportioning operation by the valve assembly 92.

In both embodiments the auxiliary chamber for "fast fill" of the pressure chamber 28 is disposed within the piston 26. Therefore, the primary piston 24 is provided with a substantially uniform outer diameter and the bore 18 from the opening 20 to the wall 22 defines a single diameter dimension.

I claim:

1. In a fast-fill master cylinder, a housing forming a reservoir containing fluid and a bore movably receiving a pair of pistons, the bore including a wall forming a substantially uniform diameter extending over the entire length of the housing, the pair of pistons cooperating with each other and with the housing to substantially define a pair of pressure chambers which normally communicate with the reservoir in a rest position for the pair of pistons, one of the pair of pistons defining an internal auxiliary pressure chamber within the one piston normally communicating with the reservoir via a passage having a valve assembly therein, the auxiliary pressure chamber receiving a position sensitive member cooperating with the one piston to contract the auxiliary pressure chamber in response to movement of the one piston away from the rest position, and check valve means carried by the one piston permitting one way fluid communication from the passage to one of the pair of pressure chambers, the one piston being movable initially away from the rest position during a brake application to generate fluid pressure within the auxiliary pressure chamber, the check valve means providing less restriction to fluid flow than the valve assembly when the fluid pressure generated in the auxiliary pressure chamber is below a predetermined value so that the generated fluid pressure is communicated to the one pressure chamber via the check valve means when the generated fluid pressure level is below the predetermined value and communicated to the reservoir via the valve assembly when the generated fluid pressure level is above the predetermined value.

2. The master cylinder of claim 1 in which the one piston defines a first clearance with the housing bore to form a portion of the passage and the one piston also defines a second clearance with the housing bore sealingly separate from the first clearance and cooperating with apertures in the housing and one piston to communicate the reservoir with a side of the position sensitive member remote from the passage.

3. The master cylinder of claim 1 in which the position sensitive member includes a stem extending outwardly of the one piston into the other pressure chamber to be engageable with the housing when the one piston is moved away from the rest position.

* * * * *